United States Patent [19]

Harper et al.

[11] Patent Number: 4,937,741
[45] Date of Patent: Jun. 26, 1990

[54] SYNCHRONIZATION OF FAULT-TOLERANT PARALLEL PROCESSING SYSTEMS

[75] Inventors: Richard E. Harper, Needham; Jaynarayan H. Lala, Wellesley, both of Mass.

[73] Assignee: The Charles Stark Draper Laboratory, Inc., Cambridge, Mass.

[21] Appl. No.: 187,452

[22] Filed: Apr. 28, 1988

[51] Int. Cl.⁵ .................................................. G06F 1/00
[52] U.S. Cl. ....................................... 364/200; 371/61
[58] Field of Search ............................. 371/16, 47, 61; 364/200 MS File, 900 MS File

[56] References Cited

U.S. PATENT DOCUMENTS

| | | | |
|---|---|---|---|
| 3,810,119 | 5/1974 | Kleidermacher | 364/200 |
| 4,335,426 | 6/1982 | Maxwell et al. | 364/200 |
| 4,351,025 | 9/1982 | Hall | 364/200 |
| 4,357,702 | 11/1982 | Chase et al. | 371/1 |
| 4,395,757 | 7/1983 | Bienvenu et al. | 364/200 |
| 4,404,681 | 9/1983 | Hullwegen | 375/102 |
| 4,412,281 | 10/1983 | Works | 364/200 |
| 4,589,066 | 5/1986 | Lam et al. | 364/200 |
| 4,591,976 | 5/1986 | Webber et al. | 364/200 |
| 4,591,977 | 5/1986 | Nissen et al. | 364/200 |
| 4,633,472 | 12/1986 | Krol | 371/40 |
| 4,665,522 | 5/1987 | Lala et al. | 371/36 |
| 4,669,118 | 5/1987 | Pospischil | 380/43 |
| 4,672,529 | 6/1987 | Kipersmit | 364/130 |
| 4,674,037 | 6/1987 | Funabashi et al. | 364/200 |
| 4,680,763 | 7/1987 | Suma et al. | 371/37 |

Primary Examiner—Charles E. Atkinson
Attorney, Agent, or Firm—Robert F. O'Connell

[57] ABSTRACT

A system for synchronizing the operation of a plurality of redundant processors forming groups thereof in which a frame of operation is defined as a time period during which a selected number of processing events occurs. For each processor, the performance of a first one of such events specifies the start of a frame and the performance of the last one of such events specifies the end of a frame. When the final event is performed by the last-to-perform of the processors of a group, the operations of all the processors of the group are then synchronized to start the next frame of operation at substantially the same time. The processors have execution rates which lie within the specified range thereof, the processors must perform their final events within a specified time period, and the processors of a group are arranged so as to start a frame of operation within another specified time period.

12 Claims, 4 Drawing Sheets

SYNCHRONIZATION OF FAULT-TOLERANT PARALLEL PROCESSING SYSTEMS

INTRODUCTION

This invention relates generally to fault-tolerant processing systems and, more particularly, to techniques for synchronizing the operation of such systems using a plurality of redundant parallel processors to provide greater efficiency, such techniques being devised so as not to unduly constrain the operating characteristics of the redundant processing sites thereof.

BACKGROUND OF INVENTION

In many systems which process information, particularly systems used for making critical decisions in real time, it is necessary that such systems have a high degree of reliability such that the allowable probability of a failure thereof per unit time is extremely low. Such systems, as may be used in highly critical applications, such as in aircraft, space vehicles, medical applications and the like, demand a substantially high level of processing performance. Such a performance includes not only the provisions of a high data throughput and large memory capability but also the ability to satisfy whatever unique requirements are imposed by the real time operational environment. Thus, the processing architecture must be designed to be capable of adapting itself to various requirements of the task being performed in real time.

Conventional redundant processing systems which can normally be used for many applications often do not have a sufficient degree of reliability to be safely used in highly critical applications, and it is desirable to provide more effective approaches to the problem of fault tolerance, particularly where more than one fault may have to be tolerated, e.g., in systems in which a single fault which arises cannot be corrected before another fault arises.

Further, such system should be designed to handle failures which may arise because of unpredictably arbitrary behavior on the part of one or more failed components. Such failures are often referred to as Byzantine faults, or as giving rise to "malicious" errors.

One such system which has been proposed is disclosed in our co-pending U.S. patent application, Ser. No. 07/187,474 filed on Apr. 28, 1988 concurrently with this application now U.S. Pat. No. 4,907,232 issued Mar. 6, 1990 and entitled "Fault/Tolerant Parallel Processing System", such patent being incorporated herein by reference.

One of the requirements for such systems is that redundant processing sites must be synchronized to within a known time skew in order to guarantee the most efficient operation thereof, particularly in the face of faulty behavior, as well as to allow the detection of a faulty, or an excessively slow, processing element in the system. In most such systems, constraints are imposed upon the processing elements by the needs for such synchronization and it is desirable that the synchronization mechanism used be effectively transparent to the applications program being implemented by the system and that the synchronization be suitable for use in a distributed system having multiple redundant processing sites.

One technique that can be used for such systems is often referred to as a "tight" synchronization process, e.g. processes using hardware synchronization mechanisms which constrain the operations of the redundant processing sites by requiring that such sites be deterministically related to the passage of time as measured by a hardware clock.

Such clock determinism constraint does not permit a wide degree of acceptable behavior on the part of the processing sites. For example, if each site has error-correcting memory and it is designed to synchronize the processing site channels by using a hardware determined clock, each channel must wait for the worst case error-correcting time period on each memory access because a given channel does not know when another channel might encounter a memory error and have to correct it. If each channel does not wait for such worst case time period then the error-correcting process, which could lengthen the number of clock cycles taken by one processor to execute a memory access, for example, would cause the processors to lose synchronization. Further, such a clock deterministic approach excludes the possibility of using relatively diverse hardware and software designs as a technique for tolerating common mode faults.

Another approach is found in software-based synchronization techniques rather than in the use of a hardware determined clock. Such software based synchronization techniques tend to constrain applications programmers by forcing applications code segments to fit within an arbitrarily imposed time frame which must in turn be sized in order to accommodate the worst case execution time of all of the processing tasks being executed in the frame. The need for software overhead, coupled with the fact that frame synchronous systems tend to utilize an excessive proportion of processor capability in executing synchronization and scheduling activities as opposed to processing activities, makes such software/frame-synchronous systems relatively inefficient and difficult to program. It is desirable to develop a synchronization system which does not depend on a hardware clock deterministic approach or on a software-based synchronization technique as in presently used systems.

BRIEF SUMMARY OF THE INVENTION

In accordance with the invention a fault-tolerant, parallel redundant processing system utilizes a synchronization concept which can be referred to as "functional synchronization". In functional synchronization, the fundamental synchronous time unit is identified as a frame of operation. While different implementations thereof may differ on how a frame of operation is particularly defined in any specific system, a frame of operation of a processor in a redundant processor system can be generally defined as a time period during which a specified number of events occurs. In a frame, an event is defined to be any countable and unambiguously definable activity of processors which make up a redundant processing group. While the number of events per frame is usually constant from frame to frame, in some systems such number of events need not be a constant from frame to frame. Events may be generated either by hardware activity, such as by the expiration of a countdown timer, or software activities, such as by the use of an operating system call. Other examples of events which can be used to define a frame of operation include the completion of a given number of processor clock cycles, the occurrence of an operating system call, the completion of a given number of iterations of an algorithm, the reading of a message, or the sending of a message.

In such a functional synchronization technique, processors which are members of a redundant group thereof may execute synchronous frames without executing the same sets of actions within those frames. When group members in some sense execute the same actions within a frame, such operation is normally referred to as providing "functional congruence". Functional congruence does not necessarily mean that all redundant sites perform the same actions but only that, at some level of abstraction, they may be regarded as generally performing the same function. For example, redundant members of a group each might perform a numeric approximation process but yet each might use a different specific arithmetic method for doing so. In such case each processor does not perform exactly the same set of steps or actions but, assuming that the end results desired for such process are logically equivalent, they each can be said to perform the same general function When all members of a redundant group of processors perform the same functions in the same frame such operation can be referred to as providing "framewise functional congruence". Using the functional synchronization techniques of the invention, synchronous operation of redundant parallel processing sites can be arranged to be effectively transparent to an application programmer and to be suitable for use in a distributed processing system at high efficiency.

In accordance with the invention, when a processor of a group of redundant processors has generated the number of events specified for a frame of operation, the generation of the last to occur event defines the end of the frame and in effect triggers the execution by the processor of a synchronous act. New frames can subsequently begin for all of the processors of the group after the synchronizing act of the last processor of the group has been triggered (showing that such last processor has completed its frame) so long as the triggering of such last generated synchronizing act is executed within a specified time period.

For such operation, the processors used must be selected so that their speeds of operation, i.e., their execution rates, are within a selected range of execution rates. Further, as mentioned above, each processor must execute its last event to identify the end of its current frame and thereby trigger this synchronizing act within a suitably defined and specified time period. Any processor not performing its last event within such specified time period is then identifiable as a faulty processor. Once the synchronizing acts of all the non-faulty processors have been triggered, the processors can be appropriately synchronized and the next frames of all non-faulty processorts are then ready to begin at the occurrence of the first event thereof.

DESCRIPTION OF THE INVENTION

The invention can be described in more detail with the help of the accompanying drawings wherein.

In the functional synchronization technique of the invention, events are equated to the occurrence of unambiguously defined actions performed by processors which are members of a processing group, e.g., a group of redundant parallel processors, during the course of their normal executions of processing tasks. Examples of such events are the sending of an outgoing message, the reading of an incoming message, the processing of a rescheduling operation, or the performance of an arithmetic processing operation. A frame is defined by the occurrence of a specified number of these events.

Figure 1:
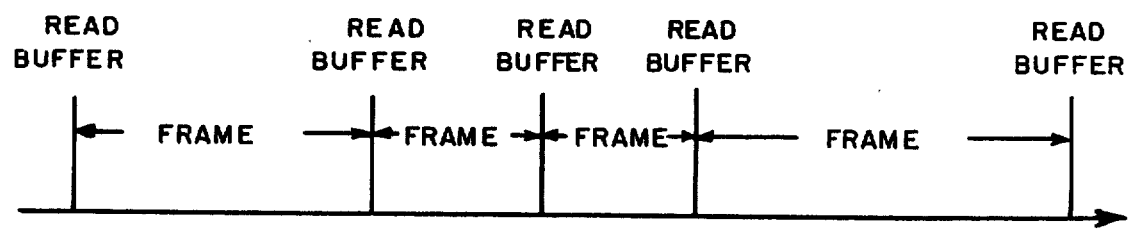
FIG. 1 illustrates the concept of frames useful in explaining the operation of the invention.

FIG. 1 shows a simple example of the above, where specifically the use of the reading of an incoming message, e.g. as from an input read buffer of a processor, is that which defines an event, with one event constituting each frame in the example shown. As mentioned above in functional synchronization the number of events per frame need not be constant and can be a function of the length of the current frame or any other selected operation parameter. In systems which include a plurality of redundant parallel processing groups, the frames of the processors of different groups need have no temporal relationship to each other and frames can be defined quite independently of each other in different groups. Thus, they may overlap, be of different lengths and periodicities and, in general, exhibit a relatively high degree of disparity from group to group.

When the requisite number of events has occurred for each processor of a redundant processing group, the occurrence of the last event defines the end of its current frame and signifies that the processor is ready to be synchronized with other non-faulty processors of the group so as to begin its next new frame. The occurrence of the last event triggers a synchronizing act, the purpose of which is to reduce the operating time skew which exists between group members to a smaller value than that existing before the synchronizing act. In one example of such a synchronizing act, the non-faulty processors of the group can be arranged to perform interactive consistency exchanges on each other's internal processor clock values so that each processor can take the mid-value thereof, for example, as its new clock value for beginning the next frame of operation for each processor. Another example of a synchronizing act of all non-faulty processors of a group is to arrange for all members of a processing group to await the arrival of the edge of an extrinsic fault tolerant clock before beginning their next frames of operation. In this way, the processors are effectively synchronized so as to begin their next frames within a relatively small time skew of each other at the occurrence of the first event thereof.

Three requirements are imposed upon a group of redundant processors when utilizing functional synchronization as generally described above. First, the members of the processing group must exhibit a differential execution rate, or differential speed of operation, which can be both upper-bounded and lower-bounded, that is, each of the processors has an execution rate or operating speed which is within a selected range of exection rates Secondly, the length of time between triggering of the synchronizing acts by the execution of the final event of a frame of all of the processors of a group must also be both upper and lower bounded, that is, the processors of a processing group must each trigger a synchronizing act within a specified time period. Thus, for example, a processor cannot continue processing forever and must perform the final event of its frame and trigger its synchronizing act before the upper-bound of such specified time period. Such conditions imply then that it is possible to both upper and lower bound the time differential within which different members of a processing group arrive at the triggering of their synchronizing acts. Such bounded time differential, or "time skew" can be defined, for convenience, as the quantity $\sigma$. Any processing member of a redundant processing group that does not arrive at its synchronizing act within the time period or time skew $\sigma$ is then identified as faulty by definition. Finally, it is assumed that the processors of a redundant group operate in a network context in which copies of a message which emanate from the network are delivered to and received by each of the processors of the group within another bounded time skew, i.e. within a specified time period which, for convenience, can be denoted as the quantity $\delta$.

Figure 2:
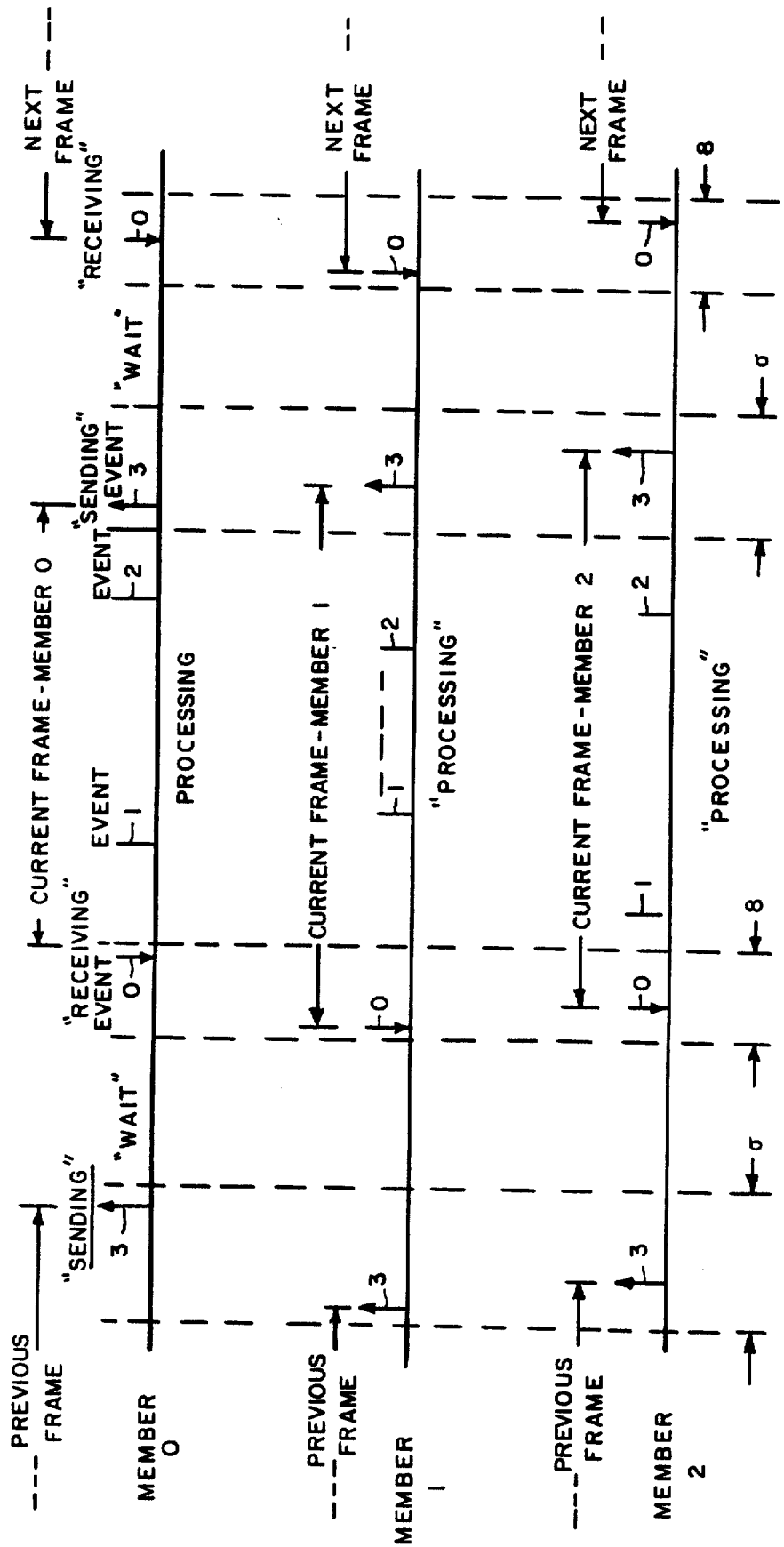
FIG. 2 illustrates in more detail exemplary operations which can be used to define the concept of frames as used in the invention.

FIG. 2 illustrates and helps to explain further the above concepts. Thus, for three processing members of a processing group, identified as members 0, 1 and 2, the time skew $\sigma$ is defined to show the maximum time differential within which different processors can arrive at the triggering of a synchronizing act, e.g., in the particular example shown, the last event for each processor is the "sending" of a message, e.g., the broadcasting by a processor of a message to other processors of the group as well as to itself, and is, in effect, the last event used to define the end of each processor's frame of operation.

The execution of such last event by the last-to-execute of the processors of the group then triggers a synchronizing act which is then used to synchronize the operations of all of the non-faulty processors of the group before they begin the next frame of operation. As mentioned above, during the wait time before the next frame the processors can exchange clock information and synchronize the operations of their own clocks to an appropriately calculated close value, e.g., the mid-value, or averaged value, of all of the processor clocks. Other techniques may also be devised within the skill of the art to synchronize the processor operations before beginning the next frame in each case. The receiving by the processors of copies of a message from the network is indicated as being delivered and so received within the bounded time skew $\delta$ as shown and is, in the example shown, the first event of each processor's next frame of operation. If the time skew $\sigma$ exceeds $\delta$ prior to the triggering of a synchronizing act, then the synchronizing of the processors, while awaiting reception of a copy of a message for the start of the next frame, synchronizes members of the redundant processing group to receive such message within the time skew $\delta$.

As shown in particular in FIG. 2, a current frame for each member processor of a group thereof is defined by the occurrence of four events as, for example, the receiving of an incoming message (Event 0), the performance of two specified computation functions (Events 1 and 2), and the sending or broadcasting of an outgoing message (Event 3). Thus, a current frame for member 0 is defined as the time period from its receiving Event 0 and its sending Event 3, as shown. The next frame cannot begin for any of the group members until each non-faulty group member has completed its current frame.

Completion of a current frame for each processor member is defined by the execution of the last event defining the frame (in this case the sending operation or Event 3) which event triggers the operation of a synchronizing act for the current frame. When Event 3 occurs for the final executing processor of the group (i.e., member 2 in the particular example shown in FIG. 2) such member triggers its synchronizing act and all of the processor members can then be appropriately synchronized to be ready to begin their next frames within the time skew $\delta$, e.g.. at the occurrence of the next message receiving event, which event starts each processor's next frame, as shown. Each processor must complete its current frame by executing its final Event 3 within the time skew $\sigma$, If a processor does not do so it is identifiable as a faulty processor.

Under functional synchronization, a certain degree of non-determinism and heterogeneity is permitted among members of a processing group but the maximum difference between the execution rates of the fastest and the slowest members of a processing group must be known. Generally the inter-synchronization interval is not known or is not constant. Accordingly, specification of the time skew $\sigma$ is done with reference to, and knowledge of, the specific software which is being utilized as well as the specific hardware with which such software is used.

The length of time between the occurrence of the last events of a frame for all of the processors of a group must be upper-bounded, as mentioned above, so that a processor of a group cannot continue to process forever without triggering its synchronizing act, as mentioned above. If it is assumed that each member of a processing group is executing a functional congruent process which can be partitioned into segments, the partitioning may be either manual (i.e. where the programmer uses a "perform synchronizing act" primitive) or automatic, (where the compilier or operating system inserts synchronizing acts upon message transmissions, upon reading of input buffers, etc.).

In accordance with the invention, functional synchronization techniques can be implemented in a manner such that the skew $\delta$ between members of a redundant processing group is reduced by arranging for such members to interact via an interconnecting network element for providing a non-deterministic synchronization operation. A system of such a nature is depicted in our above referenced co-pending patent application which shows an example of a plurality of fault containment regions each region of which has associated with it a network element, the networks for the different regions being interconnected so as to provide for interactions among them. A redundant processing group can comprise one or more processors, each processor being a part of a different fault containment region. Thus, a triplex redundant processing group comprises three processors each being a part of a different fault containment region.

The use of non-deterministic synchronization in the context of such a network system removes the necessity of using clock deterministic processing elements by avoiding the need for a deterministic relationship between the passage of time with respect to one or more of the processing elements and the passage of time with respect to an interconnection network elements which are associated with them.

Thus, if, in a particular example of a synchronizing operation, it is assumed that a synchronizing act causes each member of a redundant processing group to transmit a "sync-start" signal into the non-deterministic network system, the members of such processing group do not proceed to the end of the synchronizing act until they receive a "sync-end" signal from the network. The use of such a non-deterministic network system guarantees (a) that the arrival of sync-start signals to the network may occur synchronously with respect to the network itself and (b) that all non-faulty processors will receive a sync-end signal within a time skew bounded by $\delta$ (often where $\delta$ is much less than $\sigma$).

The arrival of sync-start signals to the network in a asynchronous manner with respect to the network itself means that there is no phase relationship between the network and the redundant processing groups. The network can be operating on one clock basis and the redundant processors of the group can be operating on another clock basis with no prior relationship required between the two clock bases.

Figure 3:
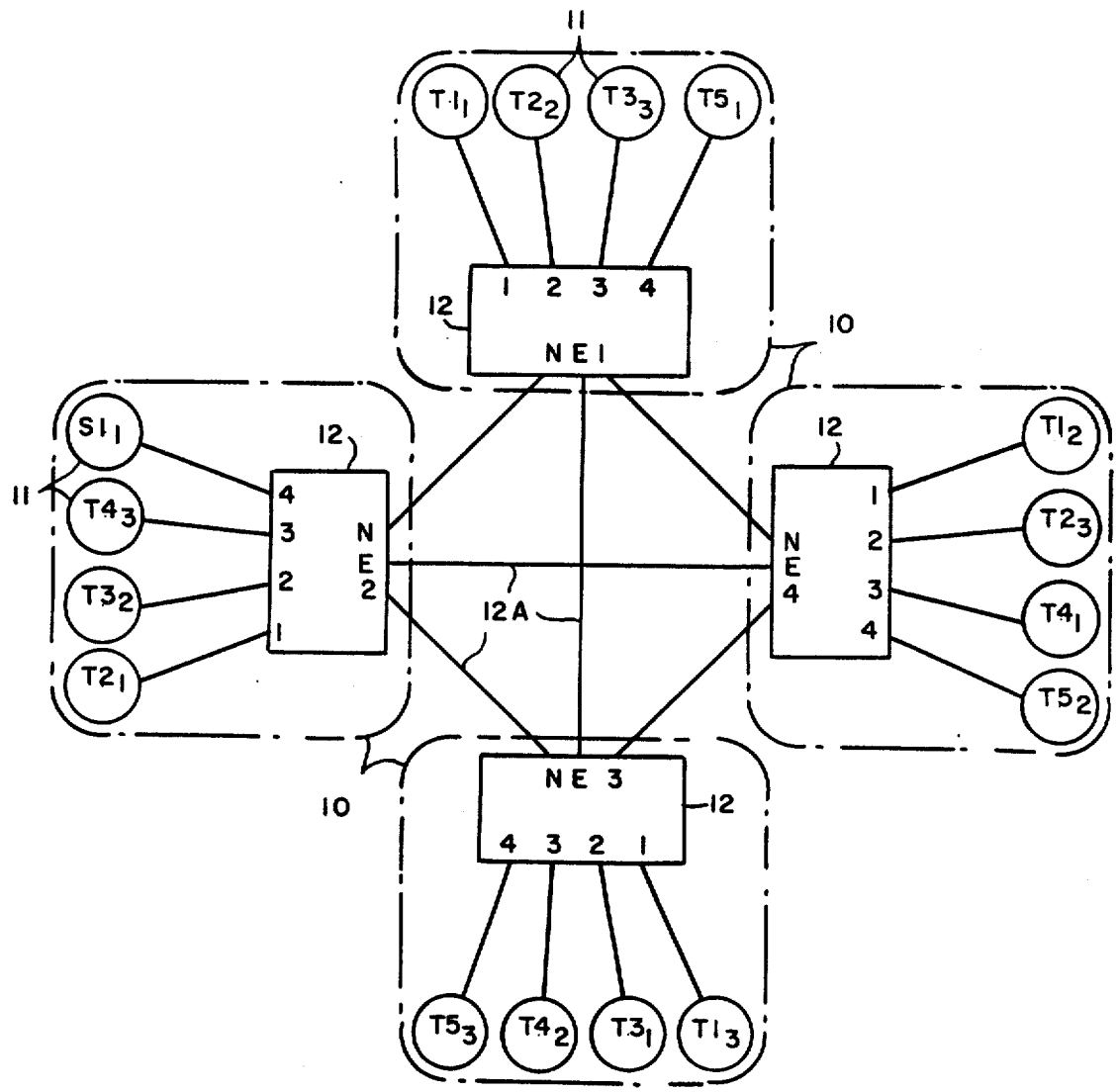
FIG. 3 shows a block diagram of an exemplary system in which the synchronizing technique of the invention can be used.
Figure 4:
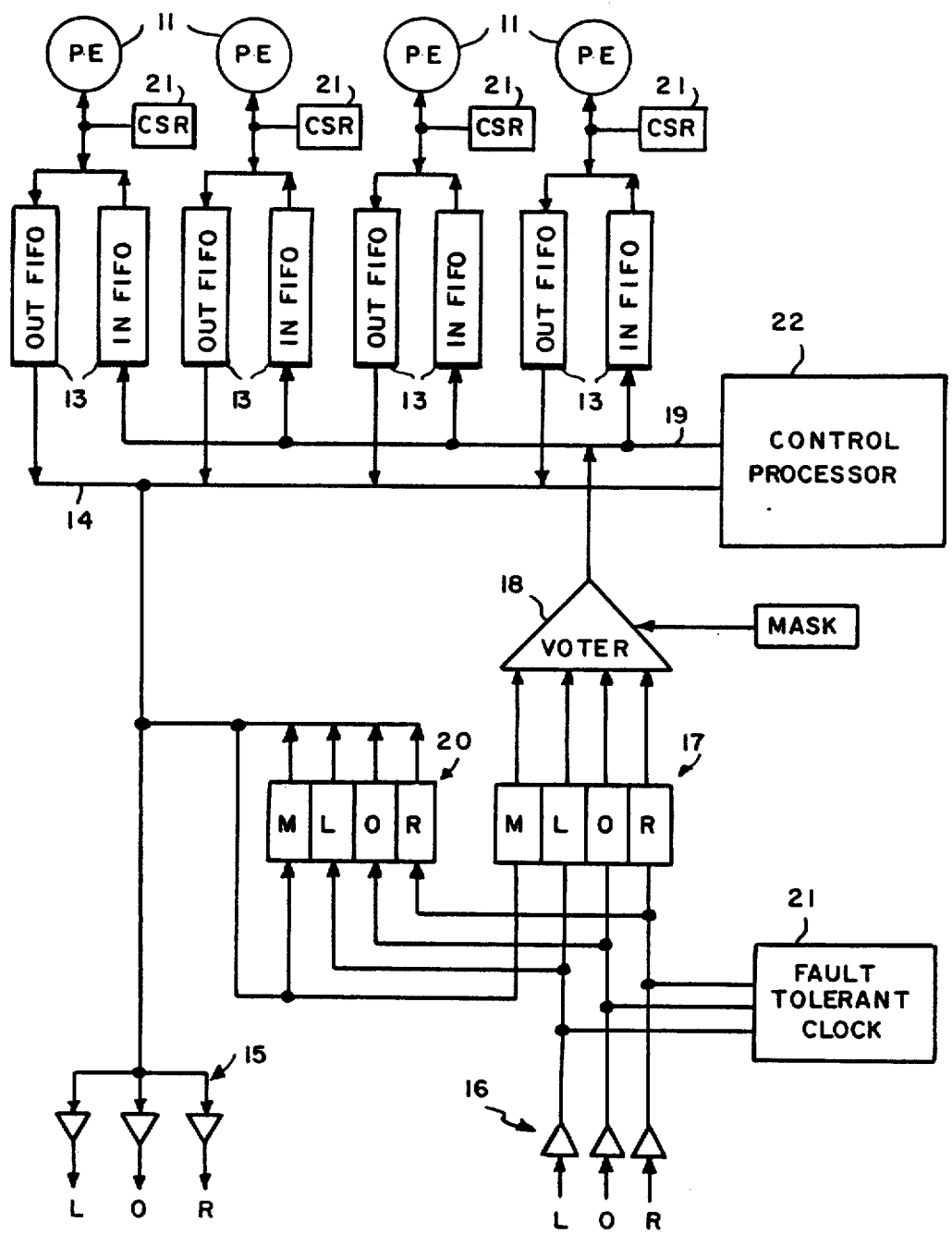
FIG. 4 shows in more detail a block diagram of a portion of the system depicted in FIG. 3.

An exemplary system, as discussed in the above referenced co-pending application, is depicted herein FIGS. 3 and 4 wherein FIG. 3 shows an overall system which includes a plurality of redundant processing groups comprising one or more processors each of which is part of a different fault containment region. Each fault containment region is associated with a network element, the network elements being in turn interconnected. FIG. 4 shows a block diagram of an exemplary network element. The operation of such a system is discussed in the above co-pending U.S. patent application.

Thus, the four fault containment regions 10 contain processing sites 11 and a network element 12. Triplex redundant processing groups T1, T2, T3, T4 and T5 and a simplex processing site S1 are shown and, in the case of the triplex groups, each processor member 11 thereof is contained in a different fault containment region 10. The above synchronizing operation is applicable to each of the above redundant processing groups, e.g. groups T1, T2, T3, T4, or T5, and the functionally synchronous operation of the invention can be applied independently within each group, i.e., the frames, the numbers and types of events, and the synchronizing acts can be defined differently from group to group. While, in a synchronizing operation for a particular group of processors, synchronizing messages are interchanged among processors of that particular processing group via network elements 12, such synchronizing messages can also be transmitted to other processing groups if some form of interaction is required between or among different processing groups.

In such a system, the synchronizing operations required following the triggering thereof at the end of the current frames of the processors of a group can be performed under control of the control processor of the network elements associated with the processors of a group using the techniques discussed above, the specific implementation thereof in the context of the system of FIGS. 3 and 4 being well within the skill of the art.

What is claimed is:

1. A system for synchronizing the operation of a plurality of redundant processors forming a group thereof wherein a frame of operation is defined for each processor as a time period during which a selected number of specified processing events occurs;

each processor of said group includes
      means for performing a final one of said specified processing events for identifying the end of a current frame of operation;
      means responsive to the performing of the final one of said specified processing events by the last-to-perform of said processors for synchronizing the operations of said processors so that all of said processors can subsequently start their next frame of operation at substantially the same time; and
   each said processor further includes
      means responsive to said synchronizing means for performing a first one of said specified processing events to identify the start of the next frame of operation.

2. A system in accordance with claim 1 wherein the performance of the final processing event defining the end of a frame of operation for each of the processors of said group is arranged to occur within a first specified time period, any processor not performing its final processing event within said first time period being identifiable as a faulty processor.

3. A system in accordance with claim 1 wherein each of the processors of a group has an execution rate which is within a selected execution rate range.

4. A system in accordance with claim 1 wherein all of the processors of the group thereof are arranged to perform the first event defining the start of a frame of operation for said processors within a second specified time period.

5. A system in accordance with claim 1 wherein a frame of operation for each processor of a group is defined as a time period during which the same number of specified processing events occur.

6. A system in accordance with claim 1 wherein said specified events are generated by hardware activities of said processors.

7. A system in accordance with claim 1 wherein said specific events are generated by software activities of said processors.

8. A system in accordance with claim 1 wherein all of said processors of a group thereof perform substantially the same general functions within a frame of operation.

9. A method for synchronizing the operation of a plurality of redundant processors forming a group thereof wherein a frame of operation is defined for each processor as a time period during which a selected number of specified processing events occurs, said method comprising the steps of
   having each processor perform a final one of a plurality of specified processing events for identifying the end of a current frame of operation for each processor;
   having each processor perform an initial one of a plurality of specified processing events to identify the start of a next frame of operation for each processor.

10. A method in accordance with claim 9 wherein the performing of the final processing event defining the end of the current frame of operation of each of the processors of said group occurs within a first specified time period for non-faulty processors.

11. A method in accordance with claim 9 wherein the performing of the initial processing event defining the start of the next frame of operation for each of the processors of said group occurs within a second specified time period for non-faulty processors.

12. A method in accordance with claim 9 wherein the processing events performed by all of the processors of said group have substantially the same general functions within a frame of operation.

* * * * *